May 22, 1951 O. E. DE LANGE 2,553,752

COMBINED MULTIVIBRATOR AND SWEEP CIRCUIT

Filed April 15, 1947

INVENTOR
O. E. DE LANGE
BY N. S. Ewing
ATTORNEY

Patented May 22, 1951

2,553,752

UNITED STATES PATENT OFFICE 2,553,752

COMBINED MULTIVIBRATOR AND SWEEP CIRCUIT

Owen E. De Lange, East Orange, N. J., assignor to Bell Telephone Laboratories, Incorporated, New York, N. Y., a corporation of New York Application April 15, 1947, Serial No. 741,539

13 Claims. (Cl. 250—36)

This invention relates to the generation of electric waves and more particularly to linear sweep circuits for cathode ray tube circuits.

An object of the invention is to generate a high level linear sweep voltage.

Another object of the invention is to simplify linear sweep circuits by eliminating the necessity of providing additional amplifiers.

A feature of the invention is a two-tube multivibrator adapted to provide a high level linear sweep voltage by shock-exciting LC resonance circuits connected thereto, and which dispenses with the need of further amplification.

In accordance with the invention, a two-tube multivibrator is provided with parallel tuned shock-excited circuits in the cathode and/or anode leads of the second tube thereof, whereby a linear sweep voltage may be taken off therefrom at such a high amplitude as to eliminate the necessity of providing further amplification.

Figure 1:
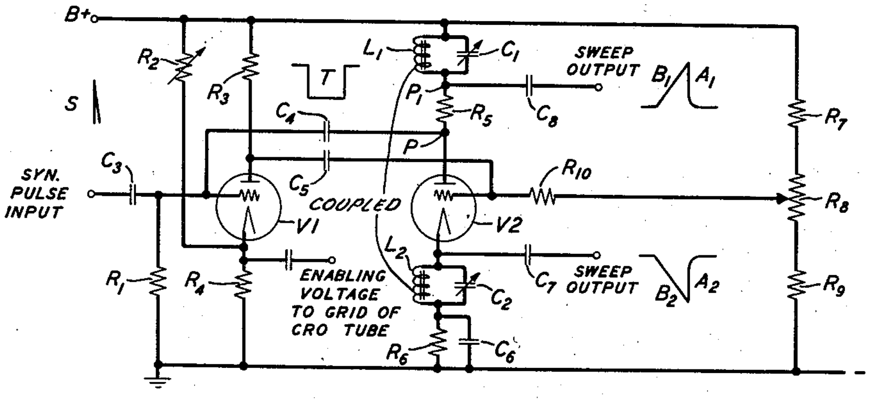
Fig. 1 shows a circuit in accordance with the invention.

Referring to Fig. 1, a combined multivibrator and sweep circuit is shown, consisting of two triode tubes $V_1$ and $V_2$, coupled together by condensers $C_5$ and $C_4$ for obtaining the conventional multivibrator flip-flop action.

In its quiescent state, the multivibrator MV shown in Fig. 1, has its first tube $V_1$ normally biased to cut-off by a positive voltage applied to its cathode K from the adjustable voltage divider $R_2$, $R_4$. The second tube $V_2$ is concomitantly in a conducting state, by virtue of a positive bias on its grid derived from adjustable voltage divider $R_7$, $R_8$, $R_9$. Such is the initial state of the combined sweep and multivibrator circuit MV with no input pulse or voltage applied to condenser $C_3$.

At the time it is desired to start a sweep, a positive synchronizing pulse of "spiked" form (S) is applied to the grid of tube $V_1$, with amplitude sufficient to overcome the cut-off bias on the cathode aforementioned. Tube $V_1$ is thereby rendered conductive, and a negative pulse therefrom passes through condenser $C_5$ to render tube $V_2$ non-conducting. A single cycle of the well-known flip-flop multivibrator action is thereby produced whereby tubes $V_1$ and $V_2$ interchange their conducting and non-conducting states.

When tube $V_2$ becomes non-conducting by virtue of its grid being carried well below cut-off by the negative pulse through $C_5$, transient oscillations are started in parallel tuned circuits $L_1C_1$ and $L_2C_2$ by shock excitation. These circuits $L_1C_1$ and $L_2C_2$ are tuned to the same frequency V.

The transient oscillations in circuit $L_1C_1$ render the plate voltage of tube $V_2$ increasingly positive and concomitantly the transient oscillations in circuit $L_2C_2$ render its cathode increasingly negative. When the cathode of tube $V_2$ becomes sufficiently negative, its potential approaches the potential of the grid of tube $V_2$ and tube $V_2$ therefore becomes conducting. The parameters $L_1C_1$ and $L_2C_2$ are so chosen that the tube $V_2$ is cut off for less than $\frac{1}{4}$ cycle of oscillation of the $L_1C_1$ and $L_2C_2$ circuits. For a high degree of linearity of sweep voltage, this time preferably should be approximately $\frac{1}{10}$ of a cycle or less.

When tube $V_2$ becomes conducting as stated previously flow of current through $R_5$ results in a decrease of voltage at the plate of $V_2$, which in turn causes a negative pulse to pass through condenser $C_4$ to the grid of tube $V_1$. Through multivibrator action, tube $V_1$ is thereby rendered non-conducting and tube $V_2$ conducts heavily again. A balanced and symmetrical sweep voltage of high amplitude may then be taken off from the plate and cathode of tube $V_2$ through condensers $C_7$ and $C_8$. The saw-toothed wave forms $A_1B_1$ and $A_2B_2$ of opposite polarity (Fig. 1) show the character of the sweep voltages taken off from the output terminals.

The amplitudes $A_1A_2$ are determined by the amplitude of the negative pulse T, passed between tubes $V_1$ and $V_2$ via condenser $C_5$, and are approximately equal thereto. The negative pulse T, shown in Fig. 1, is generated by the multivibrator action of the circuit. Its leading edge occurs at the same time as synchronizing pulse S, and its duration is determined by the duration of the linear sweep. Its amplitude is determined by the resistor $R_3$ and the amount of current drawn by tube $V_1$, when conducting.

The rate of rise of the output sweep voltages $B_1B_2$ or the "sweep expansion" is determined by the magnitude of the current flowing through tube $V_2$ just before it was cut off and by the value of the capacities $C_1$ and $C_2$. The inductances $L_1$ and $L_2$ are preferably wound on the same core so as to be very tightly coupled for the more effective damping out of the residual train of oscillations that may follow the main sweep in the shock-excitation of circuits $L_1C_1$ and $L_2C_2$. However, the degree of coupling is not critical to the operation of the circuit and the circuit will operate for some applications with no coupling between $L_1$ and $L_2$. The rate of rise of sweep voltages $B_1B_2$ may be controlled by adjusting the values of $C_1$ and $C_2$ shown variable in Fig. 1.

The wave shapes present at various test points of the combined multivibrator and sweep voltage generating circuit MV are shown in Fig. 3 and designated I—VI respectively. Curve I shows the shape and duration of the synchronizing pulse S. Curve II shows the wave shape at the grid of the tube $V_1$, the duration of the horizontal portion being due to multivibrator action. Curve III shows the wave shape at the cathode of tube $V_1$.

Curve IV shows the wave shape at the plate of tube $V_1$ and on the grid of tube $V_2$. The effect of the negative pulse passed between tubes $V_1$ and $V_2$ through the condenser $C_5$ is indicated by T. in Curve V, the voltage at the cathode of tube $V_2$ is shown due to the shock-excitation of circuit $L_1C_1$.

In curve VI, the sweep voltage taken off at terminal $P_1$ is shown as practically identical to the voltage at the cathode of tube $V_2$, but reversed in phase. The plate voltage of tube $V_2$ has the rise due to resistance $R_5$ added to the rising sweep voltage $B_1$.

To blank out all except the forward part of the sweep trace, the grid of a cathode ray tube (not shown) may have applied thereto a steady negative voltage to cut off the electron beam. The electron beam may be released by taking the enabling voltage from the cathode of tube $V_1$ as shown in Fig. 1, and coupling it to the cathode ray tube's grid whereby the latter will be rendered positive during the forward trace, thus illuminating the cathode ray tube screen during such time only.

As previously described, the multivibrator is of the "one shot" type and operates only when a synchronizing pulse is applied to it. It may be made of the "free running" type by removing the positive cut-off bias from the cathode of tube $V_1$. This would involve removing $R_2$ from the circuit. Repetition rate would then be principally controlled by the values of $C_1$ and $C_2$ and $R_1$ and $C_4$.

Figure 2:
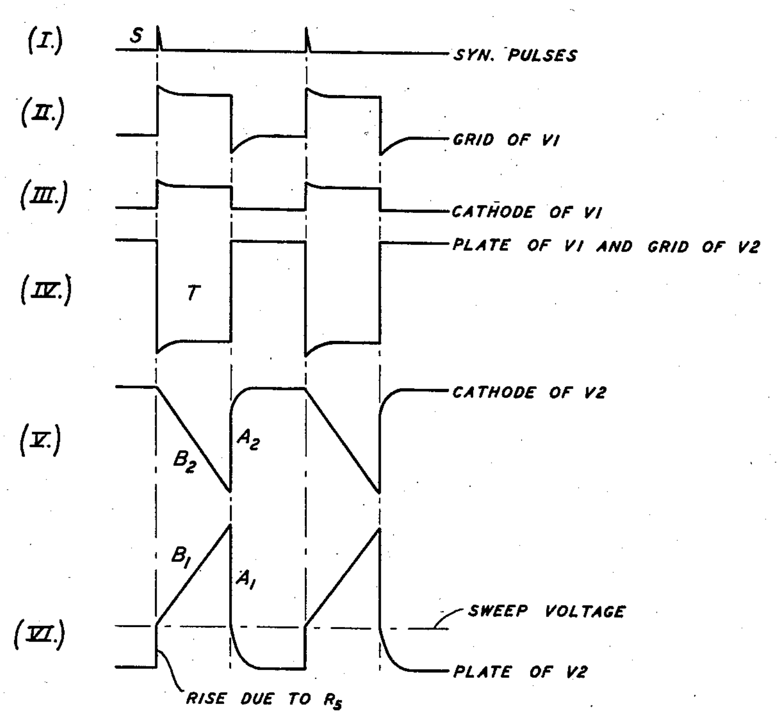
Fig. 2 shows illustrative wave shapes present at test points of this circuit.

The circuit MV may also be used as a means of producing known amounts of delay. For example, a positive pulse may be applied to the grid of tube $V_1$ and another positive pulse taken from the plate of $V_1$ at a later time as seen from the curves of Fig. 2. Since total sweep time is a linear function of the value of condenser $C_2$, the time between the positive pulses or the delay introduced by the circuit is also a linear function of $C_2$. If $C_2$ is a variable condenser of straight line capacity type its dial can be calibrated in linear units of delay.

What is claimed is:

1. A combined multivibrator and sweep voltage generating circuit comprising two tubes, each thereof comprising cathode, grid and anode electrodes connected together whereby said tubes alternately conduct and are cut off, oscillatory circuits connected to cathode and anode respectively of the second tube, said circuits being shock-excited into transient oscillation at the time the grid of said second tube is driven below cut-off to thereby render its anode increasingly positive and its cathode increasingly negative, and output leads connected to said oscillatory circuits respectively.

2. The structure of claim 1 wherein the said second tube is cut off for a time interval equal to ¼ to $\frac{1}{10}$ cycle or less of the oscillatory circuit period.

3. The structure of claim 1, and means for initially biasing the cathode of the first tube to cut-off.

4. The structure of claim 1, and means for initially biasing the grid of said second tube, whereby it conducts in its quiescent state.

5. The structure of claim 1, one of said oscillatory circuits adapted to control the period of alternation of said multivibrator.

6. A multivibrator comprising two tubes each having at least a cathode, grid and anode, connected together so as to alternately conduct and be cut off, oscillatory circuits connected to the cathode and anode of the second tube respectively, whereby transient oscillations of opposite polarity are set up when said second tube is rendered non-conducting.

7. The structure of claim 6, wherein the cut-off period is less than ¼ cycle of the oscillation of said circuits, and output leads connected to said oscillatory circuits respectively.

8. A combined multivibrator and sweep voltage generating circuit comprising a pair of tubes initially in a conductive and non-conductive state respectively, each tube being provided with cathode, grid and plate electrodes, means for reversing their states of conduction comprising an oscillatory circuit connected to the cathode of the second tube, and a second oscillatory circuit connected to the plate thereof, whereby the difference of potential between cathode and plate is increased when said second tube is cut off.

9. The structure of claim 8, and means for deriving a balanced saw-tooth voltage at said cathode and plate respectively.

10. The structure of claim 8 wherein the period of alternation of said multivibrator is controllable by varying a parameter of said first oscillatory circuit.

11. The structure of claim 8 wherein said oscillatory circuits are tightly coupled together.

12. A combined multivibrator and sweep circuit comprising a pair of vacuum tubes biased initially to be in conductive and non-conductive states, respectively, each tube being provided with cathode, grid, and plate electrodes, an individual reactive impedance connected between the plate of each tube and the grid of the other respectively for transferring electrical pulses therebetween to alter their aforementioned states, input means for feeding pulses to the grid of the first tube, and an oscillatory circuit in the cathode lead of the second tube adapted to be shock-excited for a fraction of a cycle by a pulse generated by the first tube.

13. A combined multivibrator and sweep circuit comprising a pair of vacuum tubes initially biased to be in non-conducting and conducting states, respectively, each tube being provided with cathode, grid and plate electrodes, pulsing means connected thereto and adapted to reverse said initial states, a circuit associated with the cathode of one of said tubes adapted to be shock-excited into transient oscillations for a fraction of a cycle to provide a falling potential thereon, a circuit associated with the anode of said tube and adapted to simultaneously be shock-excited to provide a rising voltage thereon, and means for deriving a balanced saw-tooth wave from said cathode and anode, respectively.

OWEN E. DE LANGE.

REFERENCES CITED

The following references are of record in the file of this patent:

UNITED STATES PATENTS

| Number | Name | Date |
|---|---|---|
| 2,412,210 | Edson et al. | Dec. 10, 1946 |
| 2,426,205 | Grieg et al. | Aug. 26, 1947 |
| 2,426,996 | Goodall | Sept. 9, 1947 |
| 2,442,769 | Kenyon | June 8, 1948 |

FOREIGN PATENTS

| Number | Country | Date |
|---|---|---|
| 485,934 | Great Britain | May 26, 1938 |